United States Patent

Heuft

(10) Patent No.: US 9,569,833 B2
(45) Date of Patent: Feb. 14, 2017

(54) METHOD AND APPARATUS FOR CHECKING A SCREW CLOSURE TORQUE WITHOUT CONTACT

(71) Applicant: HEUFT SYSTEMTECHNIK GMBH, Burgbrohl (DE)

(72) Inventor: Bernhard Heuft, Burgbrohl (DE)

(73) Assignee: Heuft Systemtechnik GmbH, Burgbrohl (DE)

( * ) Notice: Subject to any disclaimer, the term of this patent is extended or adjusted under 35 U.S.C. 154(b) by 220 days.

(21) Appl. No.: 14/381,538

(22) PCT Filed: Feb. 25, 2013

(86) PCT No.: PCT/EF2013/053662
§ 371 (c)(1),
(2) Date: Aug. 27, 2014

(87) PCT Pub. No.: WO2013/127719
PCT Pub. Date: Sep. 6, 2013

(65) Prior Publication Data

US 2015/0010229 A1  Jan. 8, 2015

(30) Foreign Application Priority Data

Feb. 27, 2012  (DE) .................. 10 2012 003 809

(51) Int. Cl.
*B65D 39/00* (2006.01)
*G06T 7/00* (2006.01)
(Continued)

(52) U.S. Cl.
CPC ............. *G06T 7/0004* (2013.01); *B67B 3/261* (2013.01); *G01L 5/24* (2013.01); *G06T 2207/10* (2013.01); *G06T 2207/30108* (2013.01)

(58) Field of Classification Search
CPC ................... G06T 7/0004; G06T 2207/30108; G06T 2207/10; G06T 2207/30164; G01L 5/24; B67B 3/261; G01N 21/90; B07C 5/3408; B07C 5/3422; G07F 7/06009
(Continued)

(56) References Cited

U.S. PATENT DOCUMENTS 4,271,974 A * 6/1981 Quinard ............. B65D 41/0478
215/331
5,414,777 A * 5/1995 van der Schaar ..... B07C 5/3412
209/526
(Continued)

FOREIGN PATENT DOCUMENTS

DE          10140009 A1      3/2003
DE     102006025811 A1     12/2007
(Continued)

*Primary Examiner* — Sheela C Chawan
(74) *Attorney, Agent, or Firm* — Drinker Biddle & Reath LLP

(57) ABSTRACT

The torque which is required to open a plastic screw closure which is screwed onto a bottle is determined without contact by the rotation position of the screwed-on plastic screw closure in relation to the bottle being established. The rotation position is established by evaluating an image on the basis of a mark on the bottle and a mark on the screw closure. Ventilation slots which interrupt the turns of the screw thread on the bottle neck can be used as the mark on the bottle, and a predetermined breaking point on a securing ring of the screw closure can be used as the mark on the screw closure.

10 Claims, 1 Drawing Sheet

(51) Int. Cl.
*B67B 3/26* (2006.01)
*G01L 5/24* (2006.01)

(58) Field of Classification Search
USPC ...... 382/142; 215/40, 43, 45, 252, 200, 250, 215/316, 329, 253, 254, 354, 201, 217, 247, 215/317, 321, 220, 318, 232, 251; 53/287, 53/331.5, 285, 329; 222/185.1, 173
See application file for complete search history.

(56) References Cited

U.S. PATENT DOCUMENTS

| | | | | |
|---|---|---|---|---|
| 6,447,625 | B1 * | 9/2002 | Schmid | B42D 5/027 |
| | | | | 156/277 |
| 6,597,804 | B1 * | 7/2003 | Heuft | G01N 21/88 |
| | | | | 348/127 |
| 6,636,625 | B1 * | 10/2003 | Nakayama | G01M 11/0278 |
| | | | | 382/141 |
| 6,654,117 | B1 | 11/2003 | Reading | |
| 7,340,086 | B2 * | 3/2008 | Werzinger | G01N 21/8851 |
| | | | | 209/524 |
| 8,001,748 | B2 | 8/2011 | Schulz et al. | |
| 8,583,382 | B1 * | 11/2013 | Loase | B67B 3/261 |
| | | | | 53/331.5 |
| 8,665,426 | B2 | 3/2014 | Huettner et al. | |
| 2011/0164131 | A1 | 7/2011 | Wiemer et al. | |

FOREIGN PATENT DOCUMENTS

| | | |
|---|---|---|
| DE | 102008062385 A1 | 7/2010 |
| EP | 0467091 B1 | 9/1994 |
| EP | 1293473 A2 | 3/2003 |
| EP | 2439488 A1 | 4/2012 |
| GB | 2135447 A | 8/1984 |
| JP | 9-169392 A | 6/1997 |
| JP | 2002-19884 A | 1/2002 |
| JP | 2009008637 A | 1/2009 |
| WO | 2011/030209 A1 | 3/2011 |

* cited by examiner

METHOD AND APPARATUS FOR CHECKING A SCREW CLOSURE TORQUE WITHOUT CONTACT

CROSS REFERENCE TO RELATED APPLICATIONS

This application is a National Stage Entry of PCT Application No. PCT/EP2013/053662 filed Feb. 25, 2013, which claims the priority benefit of German Patent Application No. 10 2012 003 809.7 filed Feb. 27, 2012, the contents of all being incorporated herein by reference.

BACKGROUND

Disclosed herein is a method for checking, without contact, whether a torque which is required to open a plastic screw closure which is screwed onto a bottle corresponds to a predetermined value. Also disclosed is an apparatus for carrying out this method.

Plastic screw closures for bottles are known from German Patent Document Nos. 24 39 414 A and 20 2007 009 983 U1. The lead of the single-start screw thread of a plastic screw closure lies at 2-3 mm. In a capping machine, plastic screw closures are screwed onto the bottles passing through by a concurrent capping head in each case clasping and tightening a closure which is loosely disposed on the bottle mouth.

When a plastic screw closure is screwed onto a bottle, the torque applied during the tightening is set according to empirical values. If this torque is set too weak then there is a risk of the bottle becoming untight. If the torque is set too high, on the other hand, the users require aids to open the plastic screw closure, which is likewise undesired.

According to the state of the art, the torque necessary for opening a plastic screw closure is checked manually by the bottles being opened manually using a torque measuring device and the measurement values being recorded. This method can also be automated by automatically diverting a bottle at certain time intervals and then determining the torque which is necessary in order to loosen the closure slightly and then close it again.

A method is known from German Patent Document No. 10 2008 062 385 by which it can be established in the case of plastic containers whether a tamper-evident closure has already been damaged during the closing of the cap. In addition, the tamper-evident closures are illuminated at an angle from below and examined from the opposite side by an opto-electronic sensor system. The torque for opening the closure is thus not checked.

A method is known from European Patent Document No. 1 293 473 in which the correct positioning of the closure on the bottle is checked. In addition, various parameters are determined, among others the height of the bottle and the upright alignment of the closure. Also in this method the torque required for opening the closure is not checked.

A method is known from European Patent Document No. 2 439 488 by which the rotational position of the thread portion is established in the case of a blank for the blow moulding of a plastic bottle. The rotational position is, for example, determined from the distance between the mouth edge and the thread turn or from a comparison of the opening section with a plurality of saved models. Also in this method the torque required for opening the closure is not checked.

It is known from European Patent Document No. 0 572 758 to bring the label and the closure of a bottle into a predetermined orientation to each other. In addition, the orientation of each bottle is determined mechanically or optically by marks on the bottle and the closure is applied according to the orientation of the bottle. The bottle and the closure are thereby located in a predetermined relative rotational position.

SUMMARY

Disclosed herein is a method by which it can be established in a running production process, without contact, with any number of bottles or with each bottle, whether the respective plastic screw closure is screwed onto the bottle too tightly or too loosely.

In the method, the rotational position of the screwed-on plastic screw closure with respect to the bottle is established by way of image evaluation of a mark on the bottle and a mark on the screw closure, wherein the rotational position of the bottle or of the screw closure is established by way of a bundle of rays which is directed underneath the screw closure at an angle upwards at a side of the bottle such that the bottle mouth is illuminated from the inside on the opposite side of the bottle, the external side of the screw closure is captured by a camera and the captured image is evaluated.

The apparatus for carrying out the method according to various embodiments of the invention has at least one light source on one side of a continuous flow of bottles which are closed by plastic screw closures, wherein the light source directs a bundle of rays at a point underneath the screw closure towards the respectively examined bottle in such a way that the internal side of the bottle and of the screw closure opposite this point is illuminated, as well as at least one optical capturing device on the other side of the bottle flow which is opposite the light source. The capturing device optically captures the image of the external side of the illuminated internal side. The apparatus further has a device for evaluating the captured image, wherein the relative rotational position of the screw closure with respect to the bottle is ascertained.

In these embodiments, the relationship between the relative angular position of the screw closure with respect to the bottle and the desired torque for opening the bottle is thus exploited. The optimum value of the rotational position of the plastic screw closure with respect to the bottle is determined empirically. Likewise, the tolerable deviation from this value is determined empirically. In customary drink bottles, the tolerance range lies e.g. at an angle of approximately 15°, thus ±7.5°, preferably approximately ±5°, further preferably approximately ±3°; everything that lies above this is too difficult to open, everything that lies below this is potentially untight. In both cases, the affected bottle is then removed from the further production process.

The light source or illumination unit is designed such that it illuminates approximately half of the circumference of the bottle neck underneath the plastic screw closure. The light source can, for example, have a plurality of optical fibres, the outlets of which are arranged on an arc segment. The light beams emitted by the individual optical fibres are directed towards an approximately semicircular region directly underneath the plastic closure or a support ring customarily present there. The light source can also have a number of correspondingly arranged and aligned LEDs.

The bundle of rays generated by the light source or illumination unit is directed upwards at an angle of for example 30°. Because the bundle of rays generated by the light source passes through in the region under the edge of the screw closure or of the support ring, the opposite semicircle of the bottle mouth and of the screw closure is as if illuminated from the inside. The bottles preferably consist, at least in the region of the bottle neck, of transparent material, with the result that the bundle of rays of the light source directed underneath the screw closure towards the bottle neck is absorbed as little as possible. Threads and other details including any marks present there on the bottle mouth are projected on the plastic screw closure from inside as on a projection screen by the directed bundle of rays of the light source. The lens action of the thread turns as well as the refraction of the light at the edges of any marks result in a sharp image on the semicircle of the plastic screw closure which is opposite the light source. Although the material of the plastic screw closures customarily contains pigments, it is semi-transparent. The material thickness of the screw closure is reduced in the grooves of the thread turns, which causes the thread turns to stand out on the external side of the closure. This image is captured by the optical capturing device and can be evaluated by image processing. Likewise, any marks stand out on the external side of the plastic closure and can be evaluated by image processing.

White LEDs or LEDs in the colour of the screw closure, which maximally exploit the sometimes very low transparency of the screw closures of drink bottles, are suitable for the illumination. In particular, infrared LEDs are particularly suitable for the illumination of the many colour pigments, as these usually only have a low absorption in infrared light.

Two such approximately semicircular illumination units can be arranged opposite each other and laterally next to the bottles passing through in such a way that the bottles can still pass through unhindered between the light sources. The semicircle of the bottle mouth and of the screw closure, opposite the respective illumination unit, is illuminated by the two semicircular illumination units. As a whole, the whole circumference of the bottle mouth is thereby projected on the external side of the plastic screw closure.

From the point of view of the camera, there are several possibilities for capturing the whole circumference of the screw closure. For example, four cameras can be arranged laterally above the bottle, with the result that each camera captures a quadrant of the screw closure. By using a mirror cabinet, in each case two images can be combined into one picture, with the result that it is possible to manage with two cameras. Furthermore, it is also possible to capture the whole surface of the screw closure with only one single camera via a cone-shaped mirror in cooperation with a cylindrical mirror.

The positioning or rotational position of the bottle with respect to the plastic screw closure can be established by a mark on the bottle and a mark on the screw closure. One possibility is thus to apply marks to the bottle as well as to the screw closure which are easily recognizable and are evaluated by camera technology (CCD camera) with image processing. The most simple way is to apply a mark to the external side of the bottle, as well as to place a mark on the upper side of the screw closure, then to capture both from above with one or more cameras and to evaluate the angular offset between the plastic screw closure and the bottle. This is very simple from the point of view of the recognition method, but requires additional outlay for the screw closures and for the bottles.

The additional outlay in the case of the plastic screw closures is, however, relatively low, as these closures are not recycled and even returnable bottles receive a new screw closure in the case of re-use. The screw closure is therefore preferably provided with at least one such marking as a mark such that at least one mark is always located in the angle of aperture of a camera which is used for the image evaluation.

In the case of returnable bottles, which are used frequently in Germany and none of which have any easily recognizable marks, this simple solution would not be practicable, as the bottles already in circulation may need to be replaced, with the result that a changeover is considerably more complex here. However, there is the possibility of recognizing distinctive marks on the bottle mouth and using them as marks. This makes the invention disclosed herein applicable also in the case of bottles already in circulation.

The start and/or end of the screw thread on the bottle neck are preferably used as a mark for establishing the rotational position of the bottle.

At least two marks are preferably evaluated for establishing the rotational position of the bottle.

Vent-slots or ventilation slots, which are frequently present in the case of plastic bottles and which interrupt the thread turns of the screw thread on the bottle neck, are preferably used as distinctive points of the bottle mouth.

Preferably, one mark is the start and/or the end of the screw thread on the bottle neck and a second mark is the ventilation slots which interrupt the thread turns of the screw thread on the bottle neck.

Also in the case of plastic screw closures a specific marking is not necessary and the constructive details of customary screw closures are sufficient for establishing the rotational position. For example, the predetermined breaking point of the securing ring, which is customarily present in the case of plastic closures and serves to safeguard the bottle contents from adulteration, can be used as a distinctive point of the screw closure. The securing ring is suspended underneath from the plastic screw closure by connecting webs.

The thread of the screw closure, a ventilation slot in the screw closure and/or a variation in a fluting of the circumference of the screw closure also come into consideration as a mark for establishing the rotational position of the screw closure.

Also in the case of the screw closure, at least two marks are preferably used for establishing the rotational position.

Further possibilities for ascertaining the rotational position of the screw closure arise with an asymmetrical arrangement of the connecting webs with which the securing ring is fixed onto the cap-shaped main part of the screw closure, or by asymmetrical design of the circumference of the screw closure, which in the most simple case is to be achieved through omission of one or more grooves of the knurling on the circumference of the screw closure. Any other mark on the circumference of the screw closure is, however, likewise suitable.

By specific forming of the screw closure features it is also possible to capture the rotational position of the screw closure with a single camera, without the whole circumferential surface of the screw closure needing to be captured. The circumferential fluting of the screw closure can be designed such that an unambiguous angle can be determined from the observed section in relation to an assumed reference line which represents the camera viewing direction. For example, a coiled line which extends over the whole circumference and which consists of a single thread turn of a helical line with a large lead can be positively or negatively stamped on the circumference of the screw closure in addition to the knurling.

The information about the rotational position of the bottle, which can be determined precisely and unambiguously by way of the ventilation slots in connection with the thread lead, can then also be contained in the same image. This can take place as follows: an image section of approximately 150° of the circumference is inspected using a mirror cabinet. This ensures that at least one clearly visible ventilation slot of the bottle mouth is located in the observed image section. It is then investigated at what height the clearly visible ventilation slot is intersected by the individual thread turns. By "height" is meant the distance from the upper or lower edge of the screw closure. In the case of the customary four aeration slots, there are also only four corresponding sets of values for the height of the point of intersection with the thread turns. It can therefore be unambiguously determined from the image of an aeration slot which of the four ventilation slots it is. Taking into account this information and the known reciprocal arrangement of the ventilation slots (adding an offset according to the slot number found) as well as the position of the ventilation slots within the image gives the angular position of the bottle with respect to the reference line, which is fixed by the camera position.

In the case of the methods described until now, the rotational positions of the bottle and of the closure are first compared separately with the optical axis of the recognition device and then correlated to each other. In a preferred embodiment, the rotational positions of the bottle and of the closure are not compared separately with the optical axis of the recognition device and then correlated to each other, but rather a mark from the screw closure is correlated directly with a mark from the bottle. The fact that the ventilation slots are frequently located not only in the thread of the bottle mouth but also in the thread of the plastic screw closure can be exploited. The aeration slots of the screw closure can therefore be arranged such that they are precisely opposite the ventilation slots on the bottle mouth or have a predetermined angular distance from these at the predetermined value of the torque. The relative arrangement of the ventilation slots can be selected in particular such that the screw closure begins to become untight and release pressure precisely when the ventilation slots are precisely opposite. The more tightly a bottle is closed, the larger the distance between the respective ventilation slots becomes. The distance of the opposite ventilation slots with respect to the state in which the torque necessary for the opening is at the optimum value is only a few degrees. The allocation of the ventilation slots is therefore always unambiguous, which means that at least one such pair of ventilation slots always falls in the 120° viewing angle of a camera and the image evaluation can therefore take place with a single camera and the evaluation of a single image.

In addition to the recognition of individual bottles which are closed too tightly or too loosely, the recognition can be made considerably more precise by forming averages dependent on the capping head, which can deliver positive evidence after only a short period of time about which of the capping heads may be readjusted in which direction.

Embodiments can also be used in a manner such that in the case of an inadmissible deviation of the rotational position of the screw closure from the rotational position of the bottle, the rotational position of the screw closure is correspondingly corrected. The screw closures can also first be screwed on with a torque that is too low, wherein it is then established by way of the method disclosed herein by what angle the screw closures may be turned still further. The screw closures can then be further turned or screwed on by this angle by a further capping head.

Plastic screw closures can be used both with glass bottles and with plastic bottles, and the method disclosed herein can accordingly be used in connection both with glass bottles and with plastic bottles. The method disclosed herein is, however, particularly suitable in connection with PET bottles.

BRIEF DESCRIPTION OF THE DRAWINGS

An embodiment is explained below with reference to the drawing. There are shown in.

DETAILED DESCRIPTION

Figure 1:
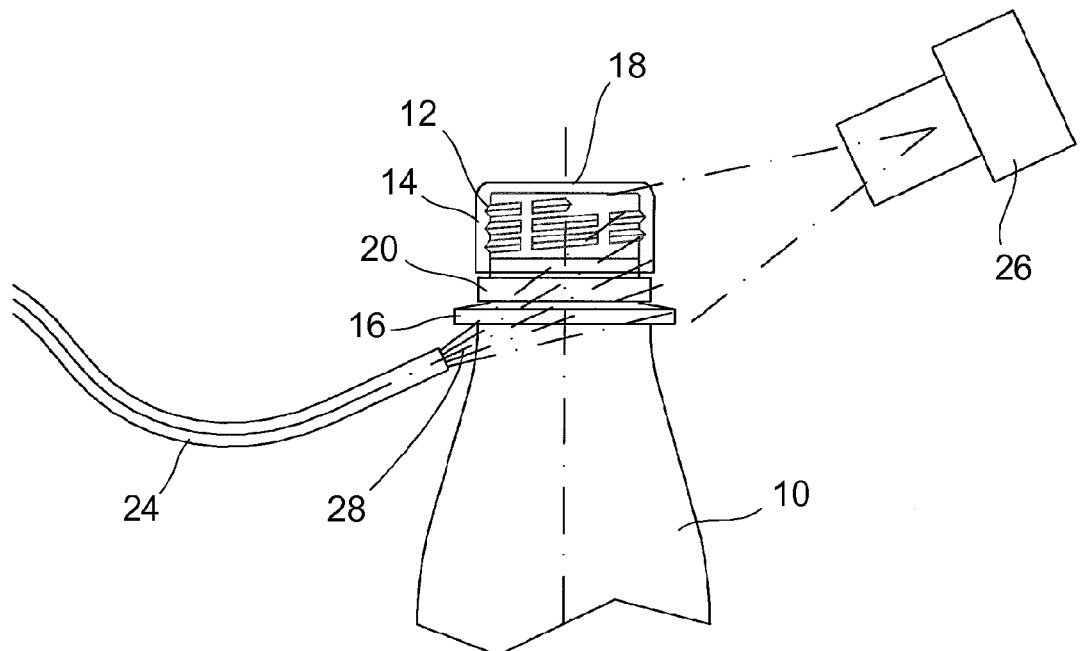
FIG. 1 the arrangement of the neck of a bottle with screwed-on screw closure between an illumination unit and a CCD camera.

In FIG. 1, the neck and the mouth of a PET drink bottle 10 is shown. A thread 12, onto which a screw closure 14 is screwed on, is formed on the mouth of the drink bottle 10. A few millimeters underneath the thread 12, a circumferential support ring 16 is further formed on the bottle neck. The screw closure 14 consists of an upper cap-shaped part 18 and a securing ring 20, which is suspended approximately 1 mm from the cap-shaped part 18 by short connecting webs 22.

The drink bottle 10 is conveyed on a conveyor, not represented, wherein the direction of transport is normal to the drawing plane. An illumination unit in the form of an optical fibre 24 is arranged on one side (in FIG. 1 on the left side) of the neck of the drink bottle 10, and a CCD camera 26 is arranged on the opposite side. The bundle of rays 28 emitted by the optical fibres 24 lies approximately on the optical axis of the CCD camera 26. The end of the optical fibres 24 is positioned underneath the support ring 16 and points upwards at an angle of approximately 30°. The opening angle of the bundle of rays 28 is likewise approximately 30°, with the result that the opposite side of the mouth region of the drink bottle 10 is illuminated from the inside. The relevant part of the bundle of rays 28 is focussed onto the adjacent internal side of the cap-shaped part 18 of the screw closure 14 by the curvature of the thread turns of the thread 12, with the result that each thread turn is perceived by the CCD camera 26 as a sharp line.

Figure 2:
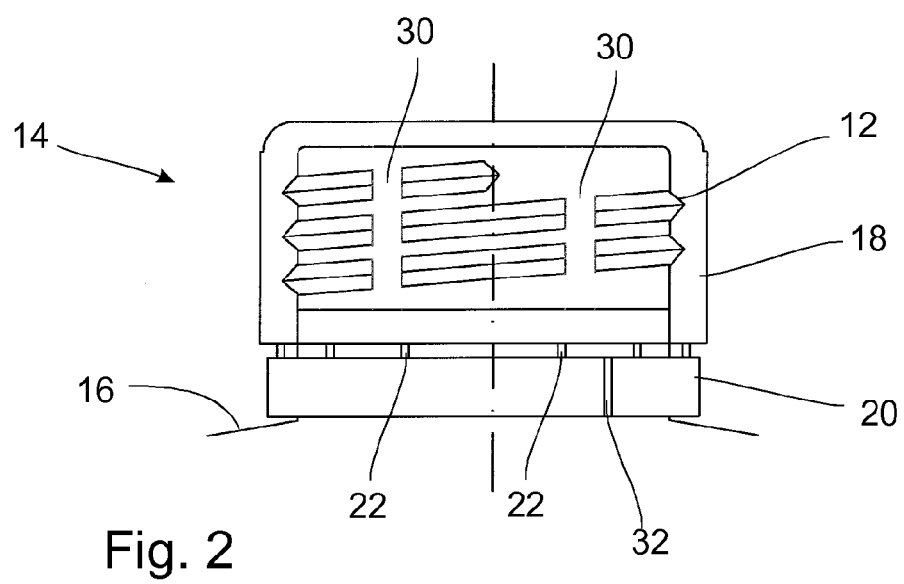
FIG. 2 the bottle mouth with screwed-on screw closure.

The thread turns are interrupted by vertically running ventilation slots 30 (FIG. 2). The square-edged ends of the thread turns along the ventilation slots 30 likewise focus the light and are therefore clearly recognizable by the CCD camera 26.

In FIG. 1, only one optical fibre 24 and one CCD camera 26 are represented, but actually two optical fibres and two CCD cameras are arranged on each side, which in each case are offset by approximately 90° to each other, with the result that the whole circumference of the screw closure 14 is captured.

As can be seen in FIG. 2, each ventilation slot 30 interrupts each of the thread turns at a different height. This allows the angular position or rotational position of the drink bottle 10 with respect to the optical axis of the CCD camera 26 to be determined.

It is further recognizable in FIG. 2 that the securing ring 20 has a predetermined breaking point 32. By way of this predetermined breaking point 32, the angular position or rotational position of the screw closure 14 with respect to the optical axis of the CCD camera 26 can be further determined.

From a comparison of the angular position of the drink bottle 10 and the angular position of the screw closure 14, it can then be determined how far the screw closure 14 has been screwed onto the drink bottle 10, i.e. the relative angular position of the screw closure 14 with respect to the drink bottle 10. If this relative angular position deviates from the intended value of this angular position by more than 7° or preferably 3°, the drink bottle 10 concerned is removed from the further production process.

| LIST OF REFERENCE NUMBERS | |
|---|---|
| 10 | bottle |
| 12 | thread |
| 14 | screw closure |
| 16 | support ring |
| 18 | cap-shaped part |
| 20 | securing ring |
| 22 | connecting webs |
| 24 | optical fibre |
| 26 | CCD camera |
| 28 | bundle of rays |
| 30 | ventilation slots |
| 32 | predetermined breaking point |

The invention claimed is:

1. A method for checking, without contact, whether a torque required to open a plastic screw closure screwed onto a transparent bottle corresponds to a predetermined value, the method comprising:
    evaluating the image of a mark on the bottle and a mark on the screw closure;
    establishing the rotational position of the screwed-on plastic screw closure with respect to the bottle by way of the image evaluation;
    wherein the rotational position of the bottle or of the screw closure is established by i) directing a bundle of rays underneath the screw closure at an angle upwards at a side of the bottle such that a bottle mouth is illuminated from inside on an opposite side of the bottle; ii) capturing an image of an external side of the screw closure by a camera; and iii) evaluating the captured image.

2. Method according to claim 1, wherein the bottle consists of transparent material at least in the region of the bottle neck.

3. Method according to claim 1, wherein the start and/or end of the screw thread on the bottle neck is used as a mark for establishing the rotational position of the bottle.

4. Method according to claim 1, wherein at least two marks are evaluated for establishing the rotational position of the bottle.

5. Method according to claim 4, wherein one mark is the start and/or end of the screw thread on the bottle neck and a second mark is ventilation slots which interrupt the thread turns of the screw thread on the bottle neck.

6. Method according to claim 1, wherein at least two marks of the screw closure are used for establishing the rotational position of the screw closure.

7. Method according to claim 1, wherein a predetermined breaking point on a securing ring of the screw closure, the thread of the screw closure, a ventilation slot in the screw closure and/or a variation in a fluting of the circumference of the screw closure are used as a mark for establishing the rotational position of the screw closure.

8. Method according to claim 7, wherein the screw closure is provided with at least one such mark as a mark such that at least one mark is always located in the angle of aperture of a camera which is used for the image evaluation.

9. Method according to claim 1, wherein the screw thread on the bottle neck and the screw thread in the screw closure have ventilation slots which, at the predetermined value of the torque, are precisely opposite or have a predetermined angular distance from each other.

10. Apparatus for carrying out the method according to claim 1, the apparatus comprising:
    at least one light source on one side of a continuous flow of bottles which are closed by plastic screw closures, wherein the light source directs a bundle of rays at a point underneath the screw closure towards the respectively examined bottle such that the internal side of the bottle and of the screw closure opposite the point is illuminated,
    at least one optical capturing device on the other side of the bottle flow opposite the light source, configured to capture the image of the external side of the illuminated internal side, and
    a device for evaluating the captured image for determining the relative rotational position of the bottle with respect to the screw closure.

* * * * *

UNITED STATES PATENT AND TRADEMARK OFFICE
CERTIFICATE OF CORRECTION

PATENT NO. : 9,569,833 B2  
APPLICATION NO. : 14/381538  
DATED : February 14, 2017  
INVENTOR(S) : Bernhard Heuft Page 1 of 1

It is certified that error appears in the above-identified patent and that said Letters Patent is hereby corrected as shown below:

On the Title Page

In (86) replace:
"PCT No.: PCT/EF2013/053662"
With:
--PCT No.: PCT/EP2013/053662--

Signed and Sealed this
Thirtieth Day of May, 2017

Michelle K. Lee
*Director of the United States Patent and Trademark Office*